United States Patent [19]

Nozawa et al.

[11] 4,332,444
[45] Jun. 1, 1982

[54] PHOTOGRAPHIC LENS CAPABLE OF PHOTOGRAPHING THE MAGNIFICATIONS

[75] Inventors: Hideyo Nozawa, Ohmiya; Hideshi Naito, Tokyo, both of Japan

[73] Assignee: Nippon Kogaku K.K., Tokyo, Japan

[21] Appl. No.: 160,161

[22] Filed: Jun. 17, 1980

[30] Foreign Application Priority Data

Jun. 29, 1979 [JP] Japan .................. 54/82187

[51] Int. Cl.³ .................. G03B 17/48; G03B 17/00
[52] U.S. Cl. .................. 354/79; 354/198; 354/289; 354/62
[58] Field of Search .......... 354/62, 79, 105, 109, 354/159, 196, 198, 289

[56] References Cited

U.S. PATENT DOCUMENTS 2,529,894  11/1950  Altman et al. .................. 354/198
3,995,289  11/1976  Shono .................. 354/109

*Primary Examiner*—Russell E. Adams
*Attorney, Agent, or Firm*—Fitzpatrick, Cella, Harper & Scinto

[57] ABSTRACT

A photographic lens comprises a first image forming optical system including focusing lens means movable in the direction of the optical axis thereof, operating means for driving the focusing lens means, display means capable of displaying the magnification of an object image formed by the first image forming optical system, a second image forming optical system for imaging the display effected by the display means, and means for driving the display means in response to the driving of the focusing lens means by the operating means to cause the magnification display by said display means to correspond to the position of the focusing lens means.

6 Claims, 7 Drawing Figures

PHOTOGRAPHIC LENS CAPABLE OF PHOTOGRAPHING THE MAGNIFICATIONS

BACKGROUND OF THE INVENTION

1. Field of the Invention

This invention relates to a device for photographing the magnifications of a photographic lens.

2. Description of the Prior Art

Having the magnifications of a lens (particularly during close-up photography) photographed on a film with an object is useful from the viewpoints of analysis, arrangement and the like of photographs. For example, when surgical operations are photographed, photographing of magnifications is necessary to judge the size or the like of the affected parts.

In medical lenses of the type in which a plurality of types of close-up lenses are prepared for a fixed focus lens so that a close-up lens corresponding to a desired magnification is selected from among them and is mounted to the lens, there is known a method of manually choosing the magnification of the selected close-up lens from among magnification photographing data plates and photographing the same. However, this method has required one to manually choose the magnification each time a close-up lens is selected and it has sometimes been the case that one forgets to choose or one chooses a wrong magnification. This has led to a disadvantage that one cannot exactly analyze the precious photographs.

SUMMARY OF THE INVENTION

It is the object of the present invention to provide a photographic lens having a magnification photographing device in which the magnification to be automatically photographed can be changed in response to a magnification changing operation.

The invention will become fully apparent from the following detailed description of embodiments thereof taken in conjunction with the accompanying drawings.

DESCRIPTION OF THE PREFERRED EMBODIMENTS

Figure 1:
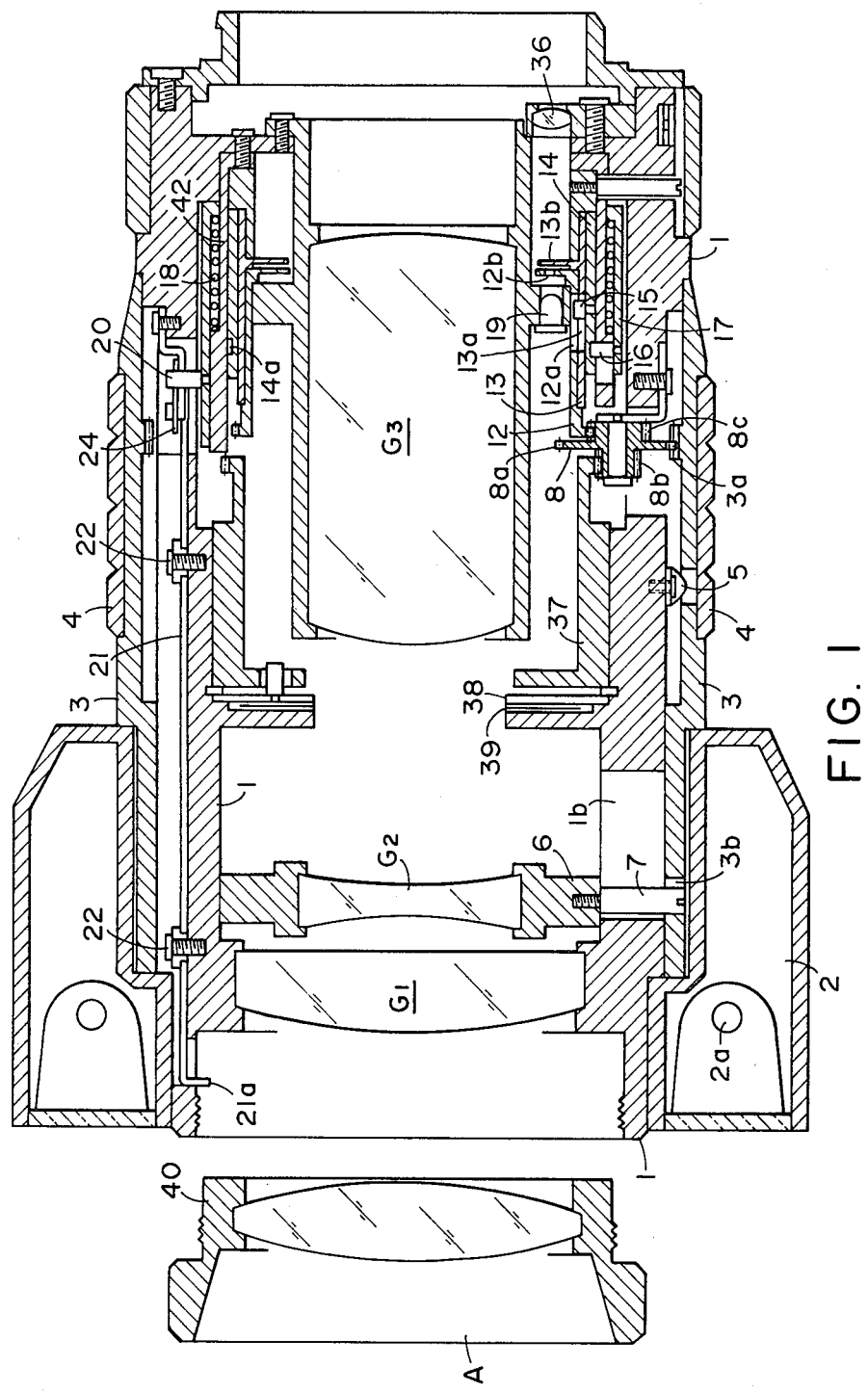
FIG. 1 is a longitudinal cross-sectional view showing an embodiment of the present invention.

Referring to FIG. 1, a focusing ring 3 is rotatably fitted on the outer periphery of a fixed ring 1. A flash unit 2 having a ring-like light-emitting portion 2a is mounted on the fixed ring 1 and may be used for flash photography. A rubber ring 4 is a finger apply portion for operating the focusing ring 3.

Lenses $G_1$, $G_2$ and $G_3$ together constitute an image forming optical system of the internal focusing type. That is, for example, photography from infinity to the proximity range is made possible by movement of the movable lens $G_2$. This movable lens $G_2$ is supported by a support 6 to which is secured a pin 7 extending through the groove 1b of the fixed ring 1 and fitted in the cam groove 3b of the focusing ring 3. Thus, when the focusing ring 3 is rotated, the lens $G_2$ is moved to effect focusing and thereby the magnification is also varied.

The large-diametered gear 8a of a relay gear 8 is in mesh engagement with the inner gear 3a of the focusing ring 3 and rotation of the focusing ring 3 is transmitted, on the one hand, to a diaphragm blade 39 through a small-diametered gear 8b, an intermediate rotatable member 37 and a diaphragm blade driving ring 38 and transmitted, on the other hand, to a ring 12 through a medium-diametered gear 8c. The transmission of the rotation of the focusing ring 3 to the diaphragm blade 39 is intended to make the aperture value (F) variable correspondingly to the object distance (D) so as to satisfy the calculation equation of the guide number (GN) of the flash unit, namely, the relation that $GN = D \cdot F$ (where D is the irradiation distance and F is the effective F-number).

The ring 12 is provided with a rectilinear groove 12a. A data display ring 13 covering and fitted to the ring 12 is also provided with a cam groove 13a. A pin 15 studded in the inner periphery of a slide ring 14 slidable around the display ring 13 in the direction of the optical axis extends through these grooves 12a and 13a.

Light-transmitting film 13b indicating a magnification scale is secured to the data display ring 13. This magnification scale need not cover all the range from infinity to the proximity range and therefore, for example, the proximity range up to the magnifications $1/10\times$, $\frac{1}{8}\times$, $1/5\times$, $\frac{1}{2}\times$ and $1\times$ is indicated in predetermined stages on the scale. In the ring 12, a plurality of lighting apertures 12b are provided in opposed relationship with the plurality of scale graduations. When the movable lens $G_2$ has been moved to the proximity range by rotation of the focusing ring 3, a pair of combinations of the apertures 12b of the ring 12 and the magnification graduations becomes opposed to a light-emitting diode 19. To inform the operator of the fact that the focusing ring 3 has been rotated to the position in which such opposed relationship has been established, a click 5 is provided between the fixed ring 1 and the focusing ring 3. That is, each time the magnification in the proximity range has become a predetermined value, the click is exerted. If a magnification scale is provided on the outer periphery of the focusing ring 3 and an index mark is provided on the fixed ring 1, external display may be accomplished and this will be convenient for operation.

By the light-emitting diode 19 being turned on at the position in which the click has been exerted, one of the graduations of the magnification display scale is imaged on the surface of a film (not shown) by the action of a lens 36 disposed in the optical path within the lens barrel and a magnification in the proximity range is photographed with the object.

Figure 3:
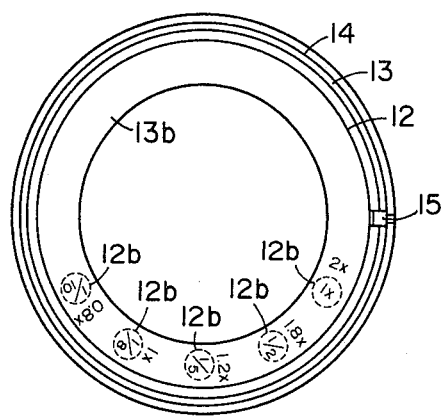
FIGS. 3 and 4 show the positional relations among an aparture ring, a display ring, a slide ring and a magnification scale when photography is effected without a close-up lens being mounted.
Figure 4:
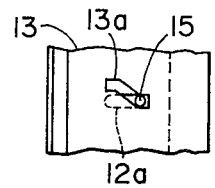

The then positional relations among the magnification scale, the ring 12, the display ring 13 and the slide ring 14 are shown in FIGS. 3 and 4. In FIG. 4, it must be noted that the pin 15 is positioned at one end of the cam groove 13a. This, as will later be mentioned, indicates the standard position in which photography is effected without a close-up lens being mounted. Also, there are shown a magnification graduations which are not opposed to the aperture 12b, and as will also be described later, this is useful when a close-up lens is used.

Now, turning back to FIGS. 1 and 2, a ring-like groove 14a is formed in the outer periphery of the slide ring 14. A rectilinear groove 42a is formed in a ring 42 fixed to the fixed ring 1, and this ring 42 is fitted over the slide ring 14. A connecting ring 17 is slidable in the direction of the optical axis and a pin 16 fixed to the inner periphery of the connecting ring 17 extends through the rectilinear groove 42a of the ring 42 and fits in the straight groove 14a of the slide ring 14.

Therefore, movement of the connecting ring 17 in the direction of the optical axis causes movement of the slide ring 14 also in the direction of the optical axis, but after the slide ring 14 has been moved in the direction of the optical axis, the rotation of the slide ring 14 corresponding to the rotation of the ring 12 is not prevented. It is attributable to the action of the straight groove 14a and the pin 16. Thus, the photographing of the magnification during the standard photography as previously described may be accomplished without any obstruction.

Figure 2:
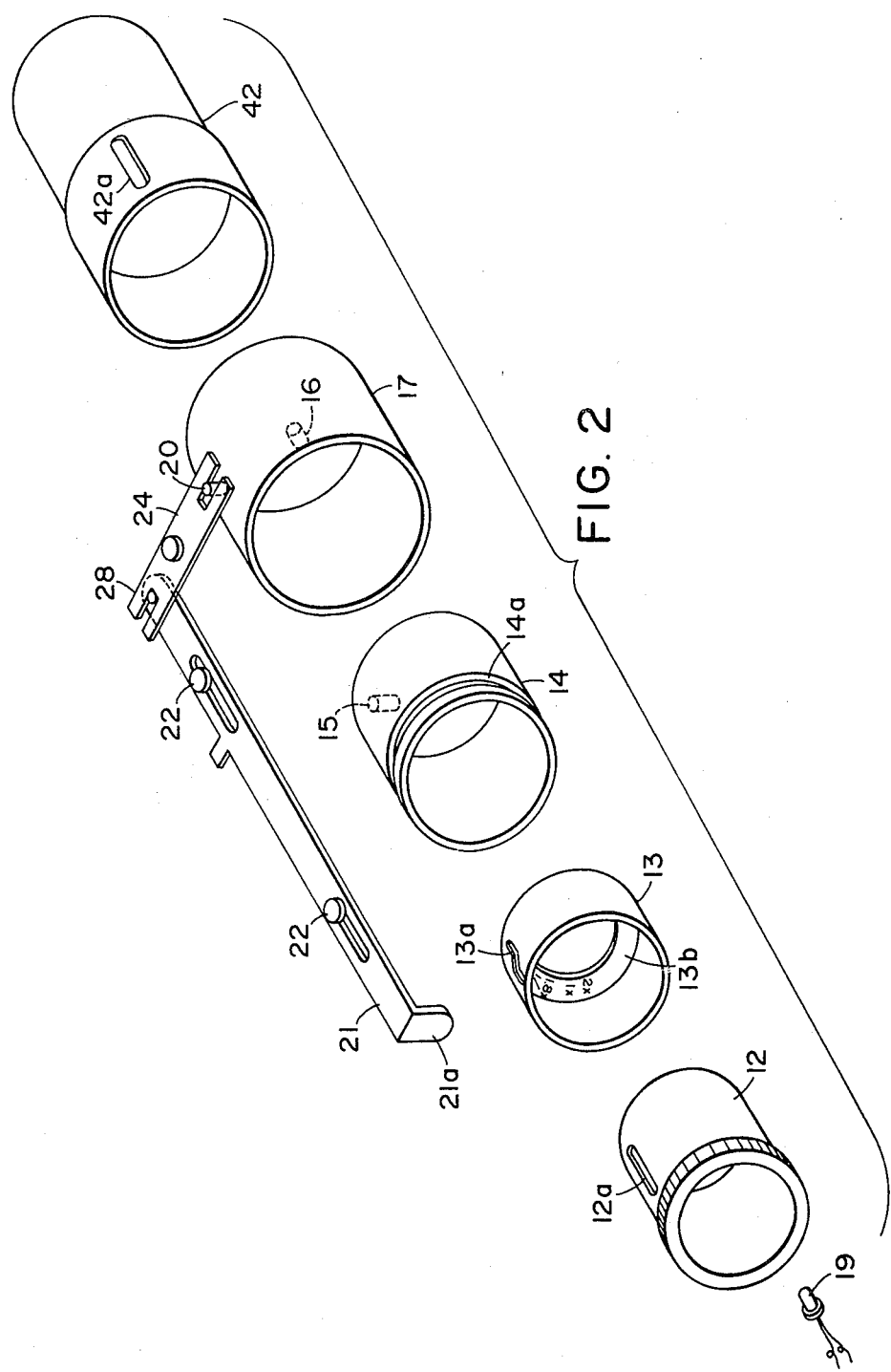
FIG. 2 is a perspective view showing the essential portions of FIG. 1.
Figure 5:
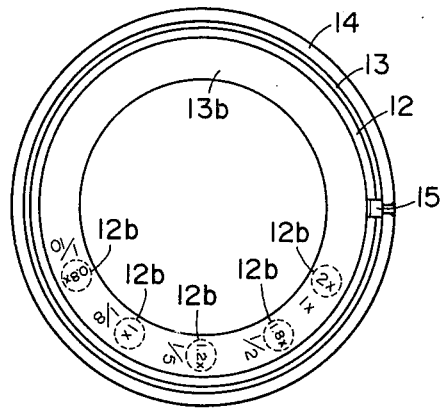
FIGS. 5 and 6 show the positional relations among the magnification scale, the aperture ring, the display ring and the slide ring when a close-up lens has been mounted.
Figure 6:
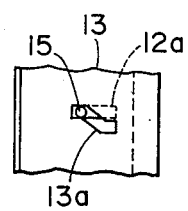

A pin 20 projectedly provided on the outer periphery of the connecting ring 17 is held by a seesaw lever 24 supported at one end on a slide lever 21 by a shaft 28. A compression spring 18 is provided between the connecting ring 17 and a ring 42 to bias these away from each other. That is, the connecting ring 17 is biased rightwardly as viewed in FIG. 1, so that the slide lever 21 is biased so as to project leftwardly in FIG. 1. FIGS. 1 and 2 show the condition in which a close-up lens has not yet been mounted. When the close-up lens A is mounted (screwed) into the front edge of the lens, the engaging end of the slide lever 21 engages the support 40 of the close-up lens and in response to the screwing, the slide lever 21 is forced in against the force of the spring 18. By this, the seesaw lever 24 is rotated clockwisely as viewed in FIG. 2 to force out the connecting ring 17 in the direction of the optical axis (leftwardly). As a result, the pin 15 of the slide ring 14 is also forced out leftwardly along the groove 12a. At this time, due to the action of the cam groove 13a and the pin 15, the display ring 13 is rotated by a predetermined amount. FIGS. 5 and 6 show the then positional relations, and as shown therein, the magnifications when the close-up lens has been mounted, for example, 0.8×, 1×, 1.2×, 1.8× and 2× are opposed to the apertures 12b. Thus, the photographing of the magnifications during the close-up photography also becomes possible.

Figure 7:
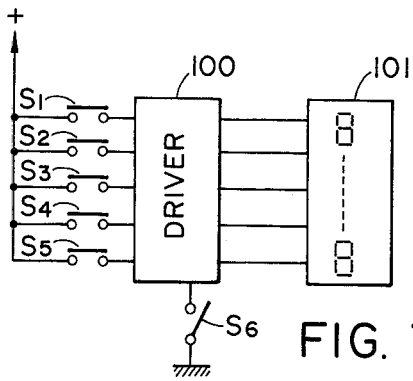
FIG. 7 shows another embodiment of the present invention.

FIG. 7 shows another embodiment of the present invention. As is apparent from what has hitherto been described, the mode of magnification display is automatically changed by the rotation of the display ring 13 during both the standard photography and the close-up photography. Therefore, in this embodiment, instead of illuminating the display scale by the light-emitting diode, the position of the display ring 13 or the ring 12 may be electrically detected to drive, for example, a segment displayer 101 in accordance with the photographing magnification.

In FIG. 7, switches $S_1$-$S_5$ are for detecting the position of the display ring 13 or the ring 12 and, when this ring comes to a position corresponding to the photographing magnification to be displayed, these switches successively become closed. In accordance with the combination logic of ON of the switches, a driver 100 causes a displayer 101 to display the magnification. This is photographed in response to the closing of the synchro-contact of the camera, for example.

A switch $S_6$ is for changing over the driving mode of the driver 100, and it detects the position of the slide lever 21, the connecting ring 17 or the slide ring 14 in the direction of the optical axis and if that position is the position of the standard photography, the switch $S_6$ is closed to cause the displayer 101 to display one of 1/10×–1×, and if that position is the position of the close-up photography, the switch $S_6$ is opened to cause the displayer 101 to display one of 0.8×–2×. The switch $S_6$ may also be of the type which bears against the support 40 of the close-up lens to detect the mounting of the close-up lens.

We claim:

1. In a photographic lens having a main image forming optical system including operating means and focusing means operated thereby to be moved in the direction of the optical axis so that magnification of an object image formed by the main image forming optical system may be varied; the lens being capable of mounting in association therewith another optical system including optical means for converting magnification of said image, the improvement comprising:
   (a) display means selectively having a first display mode in which magnification of said image attained by said main image forming optical system is displayed in response to variation in the magnification, and a second display mode in which magnification of said image attained in combination of said other optical system with said main image forming optical system is displayed in response to variation in the magnification;
   (b) means for detecting the mounting of said other optical system on the main image forming optical system; and
   (c) means for replacing said display modes in response to the detecting means.

2. A photographic lens according to claim 1, wherein said photographic lens includes a mount for attaching thereon said other optical system, and said detecting means includes a member displaceable in response to attaching said other optical system to the mount.

3. A photographic lens according to claim 2, wherein said display means includes a display member displaced by said displaceable member of the detecting means between a first position capable of displaying said first display mode and a second position capable of displaying said second display mode.

4. A photographic lens according to claim 1, wherein said lens further includes a second image forming optical system for forming an image of display of said display means on the same plane as an image forming plane of said main image forming optical system, and said second image forming optical system is disposed out of an optical path of said main image forming optical system.

5. A photographic lens according to claim 1, wherein said display means is capable of displaying said magnification in each predetermined stage, and said lens further includes means (5, $S_1$-$S_5$) for regulating the positional relation between said focusing means and said display means so that the display by said display means is effected when said focusing lens means is at a position corresponding to said each stage.

6. A photographic lens according to claim 5, wherein said display means includes a display member which has a first display portion in which display indicia for said each predetermined stage in said first mode are provided with predetermined intervals, and a second display portion in which display indicia for said each predetermined stage in said second display mode are provided with the same predetermined intervals but with different phase. 11

* * * * *